United States Patent
Yan et al.

(10) Patent No.: US 12,349,011 B2
(45) Date of Patent: Jul. 1, 2025

(54) HANDOVER METHOD AND APPARATUS

(71) Applicant: Huawei Technologies Co., Ltd., Shenzhen (CN)

(72) Inventors: Le Yan, Shenzhen (CN); Qinghai Zeng, Shanghai (CN); Hongping Zhang, Shenzhen (CN); Tingting Geng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 294 days.

(21) Appl. No.: 17/855,269

(22) Filed: Jun. 30, 2022

(65) Prior Publication Data

US 2022/0338076 A1 Oct. 20, 2022

Related U.S. Application Data

(63) Continuation of application No. PCT/CN2019/130642, filed on Dec. 31, 2019.

(51) Int. Cl.
*H04W 36/00* (2009.01)
*H04W 36/32* (2009.01)
*H04W 36/36* (2009.01)

(52) U.S. Cl.
CPC . *H04W 36/0061* (2013.01); *H04W 36/00835* (2018.08); *H04W 36/326* (2023.05); *H04W 36/362* (2023.05)

(58) Field of Classification Search
CPC ....... H04W 36/0061; H04W 36/00835; H04W 36/326; H04W 36/362; H04W 36/00837; H04W 36/328
See application file for complete search history.

(56) References Cited

U.S. PATENT DOCUMENTS

2019/0289522 A1 9/2019 Yang et al.
2022/0030498 A1* 1/2022 Futaki ................ H04W 36/362
(Continued)

FOREIGN PATENT DOCUMENTS

CN 108632926 A 10/2018
CN 109451833 A 3/2019
(Continued)

OTHER PUBLICATIONS

3GPP TSG-WG2 Meeting #101; R2-1803384; Source: Fraunhofer HHI, Fraunhofer IIS; Title: Mobility Enhancements for Aerial UEs; Athens, Greece, Feb. 26-Mar. 2, 2018 (Year: 2018).*
(Continued)

*Primary Examiner* — Mohammed S Chowdhury
(74) *Attorney, Agent, or Firm* — Leydig, Voit & Mayer, Ltd.

(57) ABSTRACT

This application provides a handover method and apparatus. The handover method includes: A terminal device sends path information used to determine a first cell to a network device; and the terminal device receives conditional handover CHO configuration information that is corresponding to the first cell and that is sent by the network device, and determines a target cell based on the CHO configuration information corresponding to the first cell. According to the technical solutions provided in this application, a handover success rate can be improved when the terminal device performs cell handover.

9 Claims, 4 Drawing Sheets

(56) References Cited

U.S. PATENT DOCUMENTS

| | | | | |
|---|---|---|---|---|
| 2022/0070752 A1* | 3/2022 | Kim | ................. | H04W 24/08 |
| 2022/0159541 A1* | 5/2022 | Fehrenbach | ........ | H04W 36/304 |
| 2022/0191752 A1* | 6/2022 | Rune | ................. | H04W 36/362 |
| 2022/0255591 A1* | 8/2022 | Park | ................. | H04W 36/362 |

FOREIGN PATENT DOCUMENTS

| | | |
|---|---|---|
| CN | 110419242 A | 11/2019 |
| CN | 110572765 A | 12/2019 |
| WO | 2019061140 A1 | 4/2019 |
| WO | 2019153302 A1 | 8/2019 |

OTHER PUBLICATIONS

3GPP TSG RAN WG2 Meeting #108; R2-1914812; Source: ZTE Corporation, Sanechips; Title: Further issues on CHO configuration and execution; Reno, Nevada, USA Nov. 18-22, 2019 (Year: 2019).*

3GPP TSG-RAN WG2 Meeting #101; R2-1803349; Source: Nokia, Nokia Shanghai Bell; Title: Mobility enhancements for UAVs-reference altitude; Athens, Greece, Feb. 26-Mar. 2, 2018 (Year: 2018).*

Ericsson, "Other Mobility enhancement for aerial UEs," 3GPP TSG-RAN WG2 #101, R2-1802790, XP051399905, Total 3 pages, 3rd Generation Partnership Project, Valbonne, France (Feb. 26-Mar. 2, 2018).

Fraunhofer HHI et al., "Mobility Enhancements for Aerial UEs," 3GPP TSG-WG2 Meeting #101, Athens, Greece, R2-1803384, XP051399754, Total 5 pages, 3rd Generation Partnership Project, Valbonne, France (Feb. 26-Mar. 2, 2018).

"Discussion on control plan signalling design for LTE CHO," 3GPP TSG-RAN WG3 #104, Reno, Nevada, US, R3-192662, Total 4 pages, 3rd Generation Partnership Project, Valbonne, France (May 13-17, 2019).

* cited by examiner

HANDOVER METHOD AND APPARATUS

CROSS-REFERENCE TO RELATED APPLICATIONS

This application is a continuation of International Application No. PCT/CN2019/130642, filed on Dec. 31, 2019, the disclosure of which is hereby incorporated by reference in its entirety.

TECHNICAL FIELD

This application relates to the communication field, and more specifically, to a handover method and apparatus.

BACKGROUND

In a conventional handover mechanism, mobility management of a terminal device in a connected mode is controlled by a network device. Specifically, a conventional handover procedure includes: The network device sends a handover message to a terminal device, where the handover message indicates the terminal device to hand over from a source cell to a target cell. Specifically, the handover message may include identification information (for example, a physical cell identifier) of the target cell and resource information (for example, random access resource information) that is required for the handover to the target cell. After receiving the handover message, the terminal device accesses the target cell based on the handover message. Therefore, successful sending of the handover message is a necessary condition for ensuring successful handover in the conventional handover mechanism. However, in an LTE system or an NR system, a handover message may fail to be sent due to fast attenuation of channel quality, fast movement of UE, blocking of an object, or long duration of measurement or handover preparation. Consequently, a handover failure is caused, and a handover success rate is reduced. To improve handover reliability, a conditional handover (CHO) mechanism is proposed. However, a current protocol does not specify how to use the CHO mechanism in an unmanned aerial vehicle scenario.

SUMMARY

This application provides a handover method and apparatus, to improve a handover success rate.

According to a first aspect, a handover method is provided. The handover method may be performed by a terminal device, or may be performed by a chip or a circuit disposed in the terminal device. This is not limited in this application. For ease of description, an example in which the handover method is performed by the terminal device may be used for description.

The Handover Method Includes:

The terminal device sends path information of the terminal device to a network device, where the path information is used to determine a first cell. The terminal device receives, from the network device, conditional handover (CHO) configuration information corresponding to the first cell. The terminal device determines a target cell based on the CHO configuration information corresponding to the first cell.

According to the handover method provided in this embodiment of this application, the terminal device sends, to the network device, the path information used to determine the first cell, receives the CHO configuration information corresponding to the first cell from the network device, and determines the target cell based on the CHO configuration information corresponding to the first cell. Because the first cell is determined with reference to the path information, that is, the network device can provide a suitable candidate cell for the terminal device, to improve a handover success rate.

With reference to the first aspect, in some embodiments of the first aspect, the CHO configuration information corresponding to the first cell is height-related; and the method further includes: The terminal device determines, based on a height at which the terminal device is located, the CHO configuration information corresponding to the first cell.

The CHO configuration information corresponding to the first cell may be height-related, and different heights correspond to different CHO configuration information corresponding to the first cell. The network device may provide height-granularity CHO configuration information corresponding to the first cell, so that the network device can flexibly and properly provide the CHO configuration information corresponding to the first cell, to improve handover reliability.

With reference to the first aspect, in some embodiments of the first aspect, the CHO configuration information corresponding to the first cell includes a CHO execution condition and at least one of the following information: a cell radio network temporary identifier C-RNTI allocated by the first cell to the terminal device, resource information required by the terminal device for accessing the first cell, index information corresponding to the first cell, identification information of the first cell, or frequency information of the first cell.

The CHO configuration information corresponding to the first cell may include the CHO execution condition corresponding to the first cell and information required for handing over the terminal device to the first cell, so that feasibility of implementing handover by the terminal device is provided.

With reference to the first aspect, in some embodiments of the first aspect, if the first cell includes one or more second cells that meet a corresponding CHO execution condition, that the terminal device determines a target cell based on the CHO configuration information corresponding to the first cell includes: The terminal device determines the target cell from the one or more second cells.

When the first cell includes at least one second cell that meets the CHO execution condition, the terminal device may select a target cell from the at least one second cell as a cell to which the terminal device is to be handed over.

With reference to the first aspect, in some embodiments of the first aspect, that the terminal device determines the target cell from a plurality of second cells includes: The terminal device determines the target cell from the plurality of second cells based on a distance change trend of the terminal device relative to a source cell.

In an embodiment, when the first cell includes at least one second cell that meets the CHO execution condition, the terminal device may select, from the at least one second cell based on the change trend of the distance between the terminal device and the source cell, a target cell as a cell to which the terminal device is to be handed over.

With reference to the first aspect, in some embodiments of the first aspect, that the terminal device determines the target cell from the plurality of second cells based on the distance change trend of the terminal device relative to the source cell includes: When a distance of the terminal device relative to the source cell increases, the terminal device selects, from the plurality of second cells, a cell that is farthest from the source cell as the target cell; or when a distance of the terminal device relative to the source cell decreases, the terminal device selects, from the plurality of second cells, a cell that is nearest from the source cell as the target cell.

When the terminal device is far away from the source cell, the terminal device may select a cell that is farthest from the source cell as the target cell. When the terminal device is close to the source cell, the terminal device may select a cell that is closest to the source cell as the target cell.

With reference to the first aspect, in some embodiments of the first aspect, the CHO configuration information corresponding to the first cell further includes distance information, where the distance information is used to indicate a distance between the first cell and the source cell.

To enable the terminal device to learn of the distance between the first cell and the source cell, the CHO configuration information corresponding to the first cell may carry the distance information indicating the distance between the first cell and the source cell.

With reference to the first aspect, in some embodiments of the first aspect, that the terminal device determines a target cell from a plurality of second cells that meet the CHO execution condition includes: The terminal device determines the target cell from the plurality of second cells based on signal quality change trends of the plurality of second cells, where the signal quality change trend of the second cell includes a change trend of signal quality of the second cell in TTT corresponding to the second cell.

In an embodiment, when the first cell includes the at least one second cell that meets the CHO execution condition, the terminal device may select, from the at least one second cell based on the signal quality change trend of the second cell, a target cell as a cell to which the terminal device is to be handed over.

With reference to the first aspect, in some embodiments of the first aspect, the target cell is a cell, in the plurality of second cells, whose signal quality change trend is an upward trend.

The terminal device may select the cell whose quality change trend is the upward trend as the target cell, to ensure that a cell with good signal quality is selected for handover.

With reference to the first aspect, in some embodiments of the first aspect, the CHO configuration information corresponding to the first cell further includes a threshold, and the target cell is a cell, in the plurality of second cells, whose signal quality change trend is an upward trend and whose signal quality change rate is greater than or equal to the threshold.

To enable the terminal device to select the cell with good signal quality as the target cell, the CHO configuration information that is corresponding to the first cell and that is sent by the network device may carry the threshold. In this way, when determining the target cell, the terminal device may select, as the target cell, the cell whose signal quality change trend is the upward trend and whose signal quality change rate is greater than or equal to the threshold.

According to a second aspect, a handover method is provided. The handover method may be performed by a network device, or may be performed by a chip or a circuit disposed in the network device. This is not limited in this application. For ease of description, an example in which the handover method is performed by the network device may be used for description.
The Handover Method Includes:

The network device receives path information of a terminal device from the terminal device, where the path information is used to determine a first cell. The network device sends, to the terminal device, conditional handover (CHO) configuration information corresponding to the first cell.

According to the handover method provided in this embodiment of this application, the terminal device sends, to the network device, path information used to determine the first cell, receives the CHO configuration information corresponding to the first cell from the network device, and determines a target cell based on the CHO configuration information corresponding to the first cell. Because the first cell is determined with reference to the path information, that is, the network device can provide a suitable candidate cell for the terminal device, to improve a handover success rate.

With reference to the second aspect, in some embodiments of the second aspect, the CHO configuration information corresponding to the first cell is height-related; and
the CHO configuration information corresponding to the first cell may be height-related, and different heights correspond to different CHO configuration information corresponding to the first cell. The network device may provide height-granularity CHO configuration information corresponding to the first cell, so that the network device can flexibly and properly provide the CHO configuration information corresponding to the first cell, to improve handover reliability.

With reference to the second aspect, in some embodiments of the second aspect, the CHO configuration information corresponding to the first cell includes a CHO execution condition and at least one of the following information: a cell radio network temporary identifier C-RNTI allocated by the first cell to the terminal device, resource information required by the terminal device to access the first cell, index information corresponding to the first cell, identification information of the first cell, or frequency information of the first cell.

The CHO configuration information corresponding to the first cell may include the CHO execution condition corresponding to the first cell and information required for handing over the terminal device to the first cell, so that feasibility of implementing handover by the terminal device is provided.

With reference to the second aspect, in some embodiments of the second aspect, the CHO configuration information corresponding to the first cell further includes distance information, and the distance information is used to indicate a distance between the first cell and a source cell.

To enable the terminal device to learn of the distance between the first cell and the source cell, the CHO configuration information corresponding to the first cell may carry the distance information indicating the distance between the first cell and the source cell.

According to a third aspect, a handover method is provided. The handover method may be performed by a terminal device, or may be performed by a chip or a circuit disposed in the terminal device. This is not limited in this application. For ease of description, an example in which the handover method is performed by the terminal device may be used for description.
The Handover Method Includes:

The terminal device receives conditional handover (CHO) configuration information corresponding to a first cell from a network device, determines, based on the conditional handover CHO configuration information corresponding to the first cell, that there are one or more second cells that meet a corresponding CHO execution condition in the first cell, and determines a target cell from the one or more second cells based on a distance change trend of the terminal device relative to a source cell.

According to the handover method provided in this embodiment of this application, when the first cell includes at least one second cell that meets the CHO execution condition, the terminal device may select, from the at least one second cell based on the distance change trend between the terminal device and the source cell, a target cell as a cell to which the terminal device is to be handed over.

With reference to the third aspect, in some embodiments of the third aspect, that the terminal device determines the target cell from a plurality of second cells based on the distance change trend of the terminal device relative to the source cell includes: When a distance of the terminal device relative to the source cell increases, the terminal device selects, from the plurality of second cells, a cell that is farthest from the source cell as the target cell; or when a distance of the terminal device relative to the source cell decreases, the terminal device selects, from the plurality of second cells, a cell that is closest to the source cell as the target cell.

When the terminal device is far away from the source cell, the terminal device may select, from candidate cells that meet the CHO execution condition, a cell that is farthest from the source cell as the target cell. When the terminal device approaches the source cell, the terminal device may select, from candidate cells that meet the CHO execution condition, a cell that is closest to the source cell as the target cell.

With reference to the third aspect, in some embodiments of the third aspect, the CHO configuration information corresponding to the first cell further includes distance information, and the distance information is used to indicate a distance between the first cell and the source cell.

To enable the terminal device to learn of the distance between the first cell and the source cell, the CHO configuration information corresponding to the first cell may carry the distance information indicating the distance between the first cell and the source cell.

According to a fourth aspect, a handover method is provided. The handover method may be performed by a terminal device, or may be performed by a chip or a circuit disposed in the terminal device. This is not limited in this application. For ease of description, an example in which the handover method is performed by the terminal device may be used for description.

The Handover Method Includes:

The terminal device receives, from a network device, conditional handover CHO configuration information corresponding to a first cell. The terminal device determines, based on the conditional handover CHO configuration information corresponding to the first cell, that there are one or more second cells that meet a corresponding CHO execution condition in the first cell, and determines a target cell from the one or more second cells based on a signal quality change trend of the one or more second cells, where the signal quality change trend of the second cell includes a change trend of signal quality of the second cell in TTT corresponding to the second cell.

According to the handover method provided in this embodiment of this application, when the first cell includes at least one second cell that meets the CHO execution condition, the terminal device may select, from the at least one second cell based on the signal quality change trend of the second cell, a target cell as a cell to which the terminal device is to be handed over.

With reference to the fourth aspect, in some embodiments of the fourth aspect, when the first cell includes the at least one second cell that meets the CHO execution condition, the target cell is a cell, in the plurality of second cells, whose signal quality change trend is an upward trend.

The terminal device may select a cell whose quality change trend is an upward trend as the target cell, to ensure that a cell with good signal quality is selected for handover.

With reference to the fourth aspect, in some embodiments of the fourth aspect, the CHO configuration information corresponding to the first cell further includes a threshold, and the target cell is a cell, in the plurality of second cells, whose signal quality change trend is an upward trend and whose signal quality change rate is greater than or equal to the threshold.

To select a second cell with good signal quality, the threshold may be carried in the CHO configuration information corresponding to the foregoing first cell, and the cell whose signal quality change trend is the upward trend and whose signal quality change rate is greater than or equal to the threshold is selected as the target cell.

According to a fifth aspect, a handover apparatus is provided. The handover apparatus includes a processor, configured to implement functions of the terminal device in the methods described in the first aspect, the third aspect, and the fourth aspect.

Optionally, the handover apparatus may further include a memory, where the memory is coupled to the processor, and the processor is configured to implement functions of the terminal device in the methods described in the first aspect, the third aspect, and the fourth aspect.

In an embodiment, the memory is configured to store program instructions and data. The memory is coupled to the processor, and the processor may invoke and execute the program instructions stored in the memory, to implement functions of the terminal device in the methods described in the first aspect, the third aspect, and the fourth aspect.

Optionally, the handover apparatus may further include a communication interface, and the communication interface is used by the handover apparatus to communicate with another device. When the handover apparatus is a terminal device, a transceiver may be a communication interface or an input/output interface.

In an embodiment, the handover apparatus includes the processor and the communication interface, configured to implement functions of the terminal device in the methods described in the first aspect, the third aspect, and the fourth.

The communication interface is used by the processor to perform external communication.

The processor is configured to run a computer program, to enable the apparatus to implement any method described in the first aspect, the third aspect, and the fourth aspect.

It may be understood that the external communication may be communication with an object other than the processor, or an object other than the apparatus.

In another embodiment, when the handover apparatus is a chip or a chip system, the communication interface may be an input/output interface, an interface circuit, an output circuit, an input circuit, a pin, a related circuit, or the like in the chip or the chip system. The processor may alternatively be embodied as a processing circuit or a logic circuit.

According to a sixth aspect, a handover apparatus is provided. The handover apparatus includes a processor, configured to implement a function of the network device in the method described in the second aspect.

Optionally, the handover apparatus may further include a memory, where the memory is coupled to the processor, and the processor is configured to implement a function of the network device in the method described in the second aspect.

In an embodiment, the memory is configured to store program instructions and data. The memory is coupled to the processor, and the processor may invoke and execute the program instructions stored in the memory, to implement the function of the network device in the method described in the second aspect.

Optionally, the handover apparatus may further include a communication interface, and the communication interface is used by the handover apparatus to communicate with another device. When the handover apparatus is a network device, the communication interface is a transceiver, an input/output interface, a circuit, or the like.

In an embodiment, the handover apparatus includes the processor and the communication interface, configured to implement a function of the network device in the method described in the second aspect.

The communication interface is used by the processor to perform external communication.

The processor is configured to run a computer program, to enable the apparatus to implement any method described in the second aspect.

It may be understood that the external communication may be communication with an object other than the processor, or an object other than the apparatus.

In another embodiment, the handover apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to a seventh aspect, a computer-readable storage medium is provided. The computer-readable storage medium stores a computer program. When the computer program is executed by a communication apparatus, the communication apparatus is enabled to implement the method in any one of the first aspect, the third aspect, the fourth aspect, or the possible embodiments of the first aspect, the third aspect, or the fourth aspect.

According to an eighth aspect, a computer-readable storage medium is provided. The computer-readable storage medium stores a computer program. When the computer program is executed by a communication apparatus, the communication apparatus is enabled to implement the method in any one of the second aspect or the possible embodiments of the second aspect.

According to a ninth aspect, a computer program product including instructions is provided. When the instructions are executed by a computer, a communication apparatus is enabled to implement the method in any one of the first aspect, the third aspect, the fourth aspect, or the possible embodiments of the first aspect, the third aspect, or the fourth aspect.

According to a tenth aspect, a computer program product including instructions is provided. When the instructions are executed by a computer, a communication apparatus is enabled to implement the method in any one of the second aspect or the possible embodiments of the second aspect.

According to an eleventh aspect, a communication system is provided, including the handover apparatus shown in the fifth aspect and the handover apparatus shown in the sixth aspect.

DESCRIPTION OF EMBODIMENTS

Figure 1:
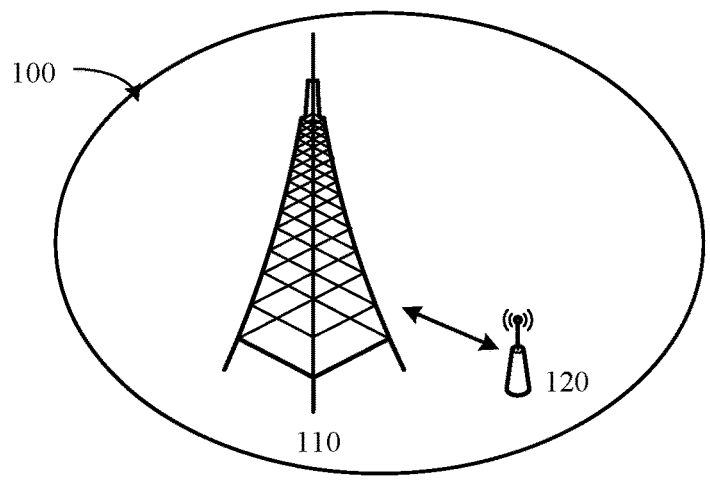
FIG. 1 is a schematic diagram of a communication system 100 applicable to a handover method according to an embodiment of this application.

The following describes the technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a 5th generation (5G) system, a new radio (NR) system, or a future network. The 5G mobile communication system described in this application includes a non-standalone (NSA) 5G mobile communication system or a standalone (SA) 5G mobile communication system. The technical solutions provided in this application are further applicable to a future communication system, for example, a 6th generation mobile communication system. Alternatively, the communication system may be a public land mobile network (PLMN), a device-to-device (D2D) communication system, a machine to machine (M2M) communication system, an internet of things (IoT) communication system, or another communication system.

A terminal device (terminal equipment) in embodiments of this application may be an access terminal, a subscriber unit, a subscriber station, a mobile station, a mobile console, a relay station, a remote station, a remote terminal, a mobile device, a user terminal, user equipment (UE), a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN), a terminal device in a future internet of vehicles, or the like. This is not limited in embodiments of this application.

By way of example and not limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that can be directly worn by a user or integrated into clothes or an accessory of a user. The wearable device is not only a hardware device, but also implements a powerful function through software support, data exchange, and cloud interaction. Generalized wearable intelligent devices include full-featured and large-size devices that can implement all or some functions without depending on smartphones, for example, smartwatches or smart glasses, and devices that focus on only one type of application function and need to work with other devices such as smartphones, for example, various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

The network device in embodiments of this application may be any communication device that has a wireless transceiver function and that is configured to communicate with the terminal device. The device includes but is not limited to an evolved NodeB (eNB), a radio network controller (RNC), a NodeB (NB), a base station controller (BSC), a base transceiver station (BTS), a home evolved NodeB (HeNB or home NodeB, HNB), a baseband unit (BBU), an access point (AP) in a wireless fidelity (Wi-Fi) system, a wireless relay node, a wireless backhaul node, a transmission point (TP), a transmission reception point (TRP), or the like. Alternatively, the device may be a gNB or a transmission point (TRP or TP) in a 5G system such as an NR system; may be an antenna panel or a group of antenna panels (including a plurality of antenna panels) of a base station in a 5G system; or may be a network node, such as a baseband unit (BBU) or a distributed unit (DU), that constitutes a gNB or a transmission point.

In some deployments, the network device in embodiments of this application may be a centralized unit (CU), a distributed unit (DU), or the like. The network device includes the CU and the DU. The gNB may further include an active antenna unit (AAU). The CU implements some functions of the gNB, and the DU implements some functions of the gNB. For example, the CU is responsible for processing a non-real-time protocol and a service, to implement functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

Further, the CU may be divided into a control plane central unit (CU-CP) and a user plane central unit (CU-UP). The CU-CP and the CU-UP may also be deployed on different physical devices. The CU-CP is responsible for a control plane function, and mainly includes the RRC layer and a PDCP-C layer. The PDCP-C layer is mainly responsible for data encryption and decryption, integrity protection, data transmission, and the like on a control plane. The CU-UP is responsible for a user plane function, and mainly includes an SDAP layer and a PDCP-U layer. The SDAP layer is mainly responsible for processing data of a core network and mapping a flow to a bearer. The PDCP-U layer is mainly responsible for at least one function of encryption and decryption, integrity protection, header compression, serial number maintenance, data transmission, and the like on a data plane. For example, the CU-CP and the CU-UP are connected through a communication interface (for example, an E1 interface). The CU-CP represents the network device and is connected to a core network device through a communication interface (for example, an Ng interface), and is connected to the DU through a communication interface (for example, an F1-C(control plane) interface). The CU-UP is connected to the DU through a communication interface (for example, an F1-U (user plane) interface).

In another possible implementation, the PDCP-C layer is also included in the CU-UP.

It may be understood that the foregoing protocol layer division between the CU and the DU, and protocol layer division between the CU-CP and the CU-UP are merely examples, and there may be another division manner. This is not limited in embodiments of this application.

The network device mentioned in embodiments of this application may be a device including a CU or a DU, or a device including a CU and a DU, or a device including a control plane CU node (a CU-CP node), a user plane CU node (a CU-UP node), and a DU node.

The network device and the terminal device may be deployed on land, and include indoor or outdoor devices and handheld or in-vehicle devices; or may be deployed on the water; or may be deployed on an airplane, a balloon, or a satellite in the air. Scenarios in which the network device and the terminal device are located are not limited in embodiment of this application.

In embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable storage media" may include but is not limited to a radio channel, and various other media that can store, include, and/or carry instructions and/or data.

For ease of understanding of embodiments of this application, the communication system shown in FIG. 1 is first used as an example to describe in detail a communication system applicable to embodiments of this application. FIG. 1 is a schematic diagram of a communication system 100 applicable to a handover method according to an embodiment of this application. As shown in FIG. 1, the communication system 100 may include at least one network device, for example, a network device 110 shown in FIG. 1. The communication system 100 may alternatively include at least one terminal device, for example, a terminal device 120 shown in FIG. 1. The network device 110 may communicate with the terminal device 120 over a radio link. A plurality of antennas may be configured for each communication device such as the network device 110 or the terminal device 120. For each communication device in the communication system 100, the configured plurality of antennas may include at least one transmit antenna configured to send a signal and at least one receive antenna configured to receive a signal. Therefore, communication devices in the communication system 100, for example, the network device 110 and the terminal device 120, may communicate with each other by using a multi-antenna technology.

It should be further understood that FIG. 1 is only a simplified schematic diagram of an example for ease of understanding. The communication system 100 may alternatively include another network device or another terminal device, which is not shown in FIG. 1.

For ease of understanding embodiments of this application, a plurality of basic concepts in embodiments of this application are briefly described. It should be understood that basic concepts described below are briefly described by using a basic concept specified in an NR protocol as an example, but there is no limitation that embodiments of this application can be applied only to an NR system. Therefore, standard names appearing when the NR system is used as an example for description are all functional descriptions, and specific names are not limited, indicate only functions of a device, and may be correspondingly extended to another system, for example, a 2G, 3G, 4G, or future communication system.

1. CHO Mechanism

In a conventional handover procedure, mobility management of a terminal device in a connected mode is controlled by a network device. To be specific, the network device indicates, by sending a handover message, the terminal device to perform handover. Specifically, a source network device sends a handover message to the terminal device, to control the terminal device to be handed over from a source cell to a target cell.

The handover message may be a radio resource control (RRC) message. For example, in an NR system, the RRC message may be an RRC reconfiguration message carrying a reconfiguration with synchronization information element (reconfiguration with sync). In an LTE system, the RRC message may be an RRC connection reconfiguration message carrying a mobility control information element (mobility control info).

The NR system is used as an example. Further, the handover message includes related information about the target cell and a related configuration parameter required by the terminal device for accessing the target cell. The information about the target cell may be a physical cell identifier (PCI) of the target cell, a cell global identifier (CGI) of the target cell, frequency information corresponding to the target cell, or a cell radio network temporary identifier (C-RNTI) allocated by the target cell to the terminal device. The frequency information corresponding to the target cell may include one or more of the following: an absolute frequency (for example, absoluteFrequencySS) of a synchronization signal (synchronization signal block, SSB), an absolute frequency location (for example, absoluteFrequencyPointA) of a reference resource module (common RBO), a frequency bandwidth list (for example, frequencyBandList), a subcarrier spacing (SCS)—specific carrier list (for example, scs-SpecificCarrierList), or the like.

The related configuration parameter required by the terminal device for accessing the target cell may include random access channel (RACH) resource information (for example, a dedicated RACH resource and/or a public RACH resource) required for accessing the target cell.

For example, after receiving the handover message, the terminal device may access the target cell based on information included in the handover message. It can be learned that successful sending of the handover message is a necessary condition for ensuring that the terminal device is successfully handed over in a conventional handover mechanism. However, in the LTE system or the NR system, the handover message may fail to be sent due to fast attenuation of channel quality, fast movement of the terminal device, blocking of an object, or long duration of measurement or handover preparation. Consequently, a handover failure is caused, and a handover success rate is reduced.

Figure 2:
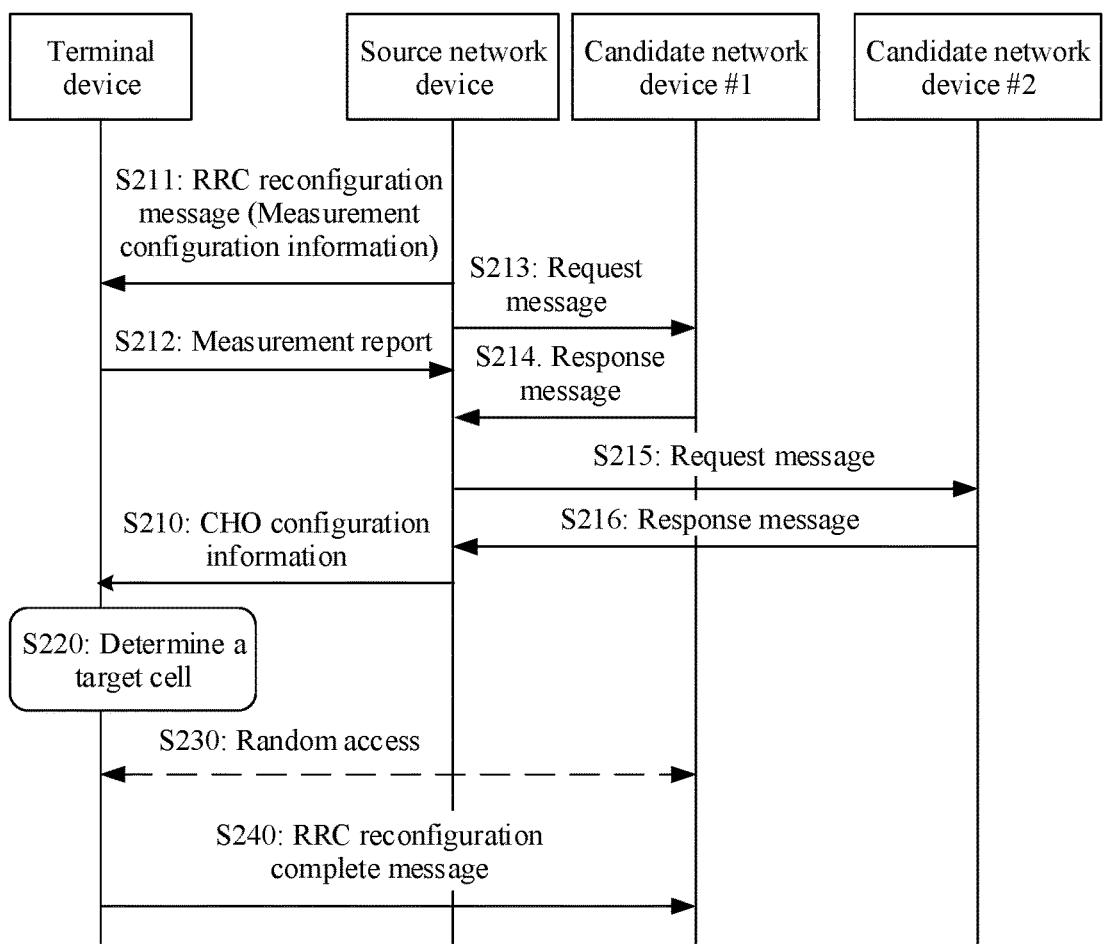
FIG. 2 is a schematic diagram of a CHO mechanism according to an embodiment of this application.

In view of the foregoing problem, a handover method using a conditional handover mechanism can improve the handover success rate. FIG. 2 is a schematic diagram of a CHO method according to an embodiment of this application. An execution body mainly includes a terminal device and a network device.

The CHO method includes at least the following steps.

S210: A source network device sends CHO configuration information to the terminal device.

For example, the source network device sends an RRC message (for example, an RRC reconfiguration message) to the terminal device when quality of a radio link (for example, which may be referred to as a source link) between a source cell and the terminal device is good. The RRC message may include CHO configuration information corresponding to at least one candidate cell, and the CHO configuration information may include information about a CHO trigger condition (which may also be referred to as an execution condition) and information about the candidate cell. The information about the candidate cell may include at least one of the following: a C-RNTI allocated by the candidate cell to the terminal device, RACH resource information required for accessing the candidate cell, a CGI of the candidate cell, a PCI of the candidate cell, or frequency information corresponding to the candidate cell. The CHO execution condition information may include a CHO execution event type and a corresponding parameter (for example, a threshold, trigger time, or a hysteresis value of CHO execution). The CHO execution event type may include an event B1, an event B2, an event A3, an event A4, an event A5, another event type, or the like. CHO execution conditions corresponding to different candidate cells may be the same or may be different. This is not limited in this application.

After receiving the RRC message including the CHO configuration information, the terminal device determines, based on the CHO configuration information, whether the at least one candidate cell meets a CHO execution condition, and uses a candidate cell that meets the CHO execution condition as a target cell. In other words, the method process shown in FIG. 2 further includes S220: The terminal device determines the target cell.

After the terminal device determines the target cell, the terminal device may perform a random access procedure with the determined target cell. In other words, the method process shown in FIG. 2 further includes S230: The terminal device initiates random access.

When the random access is successfully completed, the terminal device sends the RRC message (for example, an RRC reconfiguration complete message) to a network device (namely, a target network device, for example, a candidate network device #1 in FIG. 2) to which the target cell belongs, to notify the target network device that the conditional handover is completed. In other words, the method process shown in FIG. 2 further includes S240: The terminal device sends the RRC message to the candidate network device #1 (namely, the target network device). Optionally, a random access procedure S230 may be skipped. For example, when the RRC message including the CHO configuration information includes RACH-less information (such as TA information and UL grant information) corresponding to the at least one candidate cell, a RACH procedure may be skipped. In other words, after determining the target cell, the terminal device may directly send the RRC reconfiguration complete message to the target network device.

It should be understood that before the source network device performs S210, the source network device sends the RRC reconfiguration message to the terminal device. The RRC reconfiguration message includes measurement configuration information, to indicate the terminal device to measure quality of a neighboring cell. After performing measurement, the terminal device reports a measurement result to the source network device. The source network device sends a request message (for example, the request message may be a handover request message) to at least one candidate network device (that is, a network device to which the candidate cell belongs). The request message is used to request the candidate network device to prepare for a CHO procedure (for example, prepare/configure the foregoing "information about the candidate cell"), and may receive a response message (for example, the response message may be a handover request response message) from the candidate network device. In other words, the method process shown in FIG. 2 further includes six steps S211 to S216 shown in FIG. 2. It may be understood that the source network device and the candidate network device may be a same network device, or may be different network devices. If the source network device and the candidate network device are a same network device, signaling interworking may not be performed between the source network device and the candidate network device. For example, if the source network device and the candidate network device #1 are a same network device, S213 and S214 may be omitted. This is only an example, and is not limited thereto.

As described above, in the CHO mechanism, because the source network device sends the CHO configuration information to the terminal device when communication quality of the source link is good, a sending success rate of the CHO configuration information is ensured, thereby improving a handover success rate.

2. Determining the Target Cell

In the CHO mechanism shown in FIG. 2, after receiving the CHO configuration information, the terminal device needs to determine the target cell. Specifically, in the CHO mechanism, the source network device may configure one or more candidate cells. After receiving the CHO configuration information, the terminal device determines whether the CHO execution condition is met.

In an embodiment, it is assumed that in correspondence to a candidate cell A, a configured CHO execution event type is an event A3, and a configured corresponding threshold is a first threshold (for example, offset (offset) dB). In this case, when cell signal quality of the candidate cell A is better than that of a serving cell and a signal quality difference is greater than or equal to the first threshold, it may be considered that the candidate cell A meets the CHO execution condition, and the candidate cell A may be determined as the target cell.

In another embodiment, it is assumed that in correspondence to a candidate cell B, a configured CHO execution event type is an event A5, and configured corresponding thresholds are a second threshold and a third threshold. In this case, when cell signal quality of the candidate cell B is greater than the second threshold, and cell signal quality of a serving cell is less than the third threshold, it may be considered that the candidate cell B meets the CHO execution condition, and the candidate cell B may be determined as the target cell.

Further, if the CHO configuration information includes time to trigger (time to trigger, TTT), the TTT may be at a cell granularity, that is, TTT corresponding to different candidate cells may be the same or different. For example, the CHO configuration information may include one or more periods of TTT, there may be a one-to-one, many-to-one, or one-to-many correspondence between a candidate cell and TTT, and TTT corresponding to each candidate cell may be the same or different. This is not limited in this application. In this case, the terminal device may determine that a candidate cell meets a CHO execution condition only when the candidate cell always meets the CHO execution condition within TTT corresponding to the candidate cell (for example, signal quality of the candidate cell always meets a trigger condition of the event A3 within the TTT).

Optionally, if a plurality of candidate cells each meet a corresponding CHO execution condition, the terminal device may select, according to a rule, one cell from the plurality of candidate cells that meet the CHO execution conditions as the target cell. For example, a cell with highest signal quality in the plurality of candidate cells that meet the CHO execution conditions is determined as the target cell; or a cell with a highest priority (for example, a highest frequency priority) in the plurality of candidate cells that meet the CHO execution conditions is determined as the target cell; or a cell having a largest quantity of excellent beams (where the excellent beam means that signal quality of a beam is greater than a predetermined threshold, where the predetermined threshold may be carried in an RRC message including the CHO configuration information, or may be agreed on in a protocol, and this is not limited in this application) in the plurality of candidate cells that meet the CHO execution conditions is determined as the target cell; or any cell in the plurality of candidate cells that meet the CHO execution conditions is determined as the target cell; or the target cell is determined in another manner.

It should be understood that a mobile communication system is initially designed mainly for a ground terminal device. When a height of the terminal device is higher than that of a base station, interference increases and frequent handover occurs. For example, the terminal device is an unmanned aerial vehicle (aerial UE). When a flight height of the unmanned aerial vehicle is higher than that of the base station, the following problems occur when the unmanned aerial vehicle accesses a network for communication:

Problem 1: Because a base station signal mainly radiates towards a ground, although some signals are diffused to the air due to ground signal reflection or scattering, or some side lobes of a base station antenna radiate to the air, generally strength of a signal received by the drone is low.

Problem 2: When the unmanned aerial vehicle is flying at a high altitude, the unmanned aerial vehicle may receive signals from many neighboring stations due to fewer obstacles, and this causes severe downlink interference.

Therefore, for a moving scenario of the unmanned aerial vehicle, the foregoing CHO mechanism can improve a handover success rate and reliability of the unmanned aerial vehicle. Application of the CHO mechanism in a moving scenario of the unmanned aerial vehicle may depend on a flight path of the unmanned aerial vehicle. The following briefly describes flight path reporting of the unmanned aerial vehicle in this application.

3. The Flight Path Reporting of the Unmanned Aerial Vehicle

The network device may send a terminal device information request (UEInformationRequest) message to the unmanned aerial vehicle, and the message is used to request the unmanned aerial vehicle to report flight path information.

Optionally, the request message may include a maximum quantity (for example, N) of route points/coordinate points that can be reported by the unmanned aerial vehicle, and whether timestamp information needs to be reported. After receiving the request message, the unmanned aerial vehicle returns a terminal device information response (UEInformationResponse) message to the network device. The response message may include location information (for example, the location information may include longitude information, latitude information, and height information) of one or more route points/coordinate points, and timestamp information (for example, the timestamp information may include absolute time information or relative time information) corresponding to each route point/coordinate point passed by the unmanned aerial vehicle. The timestamp information may also be reported depending on whether the timestamp information needs to be reported in the request message. If the timestamp information does not need to be reported in the request message, the timestamp information may not be reported.

Figure 3:
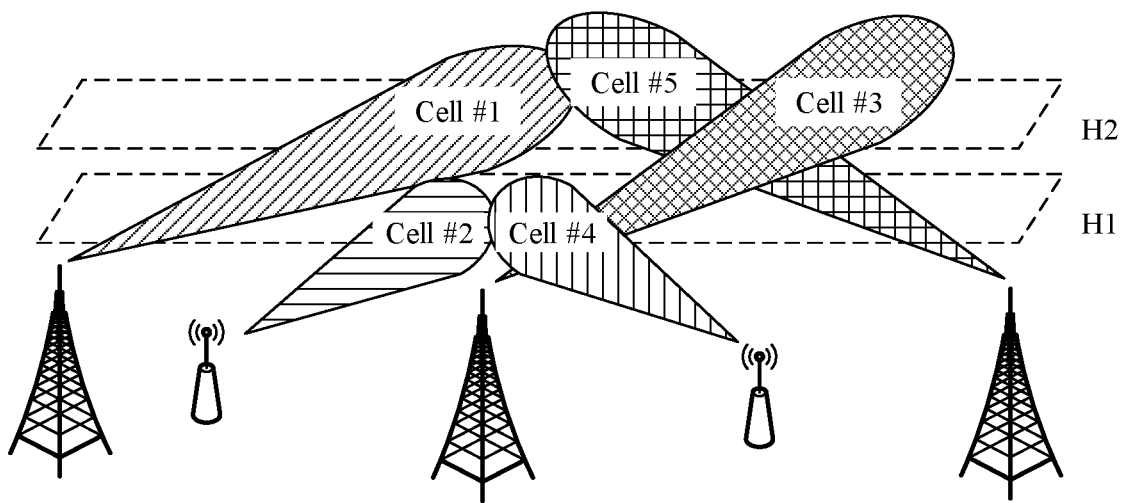
FIG. 3 is a schematic diagram of cells detected by an unmanned aerial vehicle according to an embodiment of this application.

For the unmanned aerial vehicle, cells that can be detected by the unmanned aerial vehicle are different when the unmanned aerial vehicle is located at different heights in the air. FIG. 3 is a schematic diagram of a cell detected by an unmanned aerial vehicle according to an embodiment of this application. It can be learned from FIG. 3 that when a height of the unmanned aerial vehicle is H1, cells that can be detected are (cell #1, cell #2, cell #3, cell #4, and cell #5); or when a height of the unmanned aerial vehicle is H2, cells that can be detected are (cell #1, cell #3, and cell #5).

According to a handover method provided in this application, a CHO mechanism can be used in an unmanned aerial vehicle scenario, to improve a success rate of cell handover performed by the unmanned aerial vehicle. However, it should be understood that the handover method provided in embodiments of this application is not limited to the unmanned aerial vehicle scenario.

In addition, to facilitate understanding of embodiments of this application, the following a plurality of descriptions are provided.

First, in this application, "being used to indicate" may include "being used to directly indicate" and "being used to indirectly indicate". When a piece of indication information is described as indicating A, the indication information may directly indicate A or indirectly indicate A, but it does not necessarily indicate that the indication information includes A.

Information indicated by the indication information is referred to as to-be-indicated information. In a specific implementation process, there is a plurality of manners of indicating the to-be-indicated information. For example, but not limited to, the to-be-indicated information may be directly indicated, for example, the to-be-indicated information or an index of the to-be-indicated information is indicated. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent. In addition, a common part of all pieces of information may be further identified and indicated in a unified manner, to reduce indication overheads caused by separately indicating same information.

Second, "first", "second", and various numerical numbers (for example, "#1" and "#2") in this application are merely used for differentiation for ease of description, but are not intended to limit the scope of embodiments of this application. For example, different indication information is differentiated.

Third, in this application, "preset" may include: being indicated by the network device by using signaling, or predefined, for example, defined in a protocol. "Pre-definition" may be implemented by prestoring corresponding code or a corresponding table in a device (for example, including a terminal device and the network device), or in another manner that may be used to indicate related information. A specific implementation is not limited in this application.

Fourth, "storage" in embodiments of this application may be storage in one or more memories. The one or more memories may be separately disposed, or may be integrated into an encoder, a translator, a processor, or a communication apparatus. Alternatively, a part of the one or more memories may be separately disposed, and another part of the one or more memories may be integrated into the translator, the processor, or the communication apparatus. A type of the memory may be a storage medium in any form, and this is not limited in this application.

Fifth, a "protocol" in embodiments of this application may be a standard protocol in the communication field, for example, may include an LTE protocol, an NR protocol, and a related protocol applied to a future communication system. This is not limited in this application.

With reference to FIG. 1, the foregoing briefly describes a scenario to which the handover method provided in embodiments of this application can be applied, and describes basic concepts that may be used in embodiments of this application. With reference to the accompanying drawings, the following describes in detail the handover method provided in embodiments of this application.

It should be understood that the handover method provided in embodiments of this application may be applied to a system in which communication is performed by using a multi-antenna technology, for example, the communication system 100 shown in FIG. 1. The communication system may include at least one network device and at least one terminal device. The network device and the terminal device may communicate with each other by using the multi-antenna technology.

It should be further understood that, a specific structure of an entity for performing the method provided in embodiments of this application is not particularly limited in the following embodiments, provided that the entity can run a program that records code of the method provided in embodiments of this application to perform communication according to the method provided in embodiments of this application. For example, the entity for performing the method provided in embodiments of this application may be the terminal device, the network device, or a functional module that is in the terminal device or the network device and that can invoke and execute the program.

Without a loss of generality, interaction between the network device and the terminal device is used as an example below to describe in detail the handover method provided in embodiments of this application.

Figure 4:
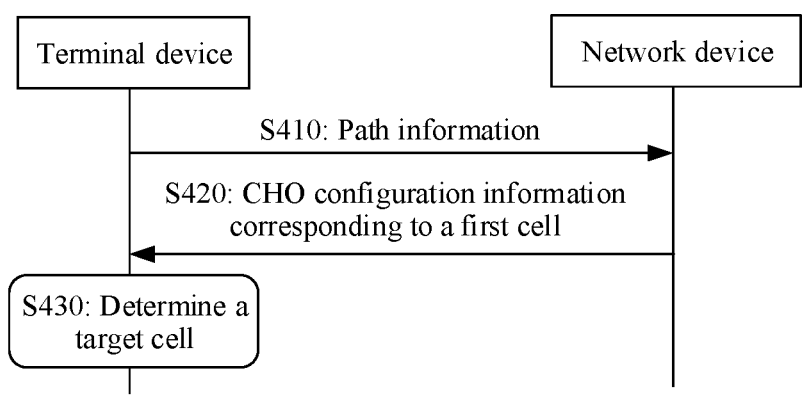
FIG. 4 is a schematic flowchart of a handover method according to an embodiment of this application.

FIG. 4 is a schematic flowchart of a handover method according to an embodiment of this application. Execution bodies in the flowchart include a terminal device and a network device.

The handover method includes at least some of the following steps.

S410: The terminal device sends path information to the network device. The network device may be a source network device.

In an embodiment, that the terminal device sends path information to the network device may be: receiving, by the terminal device, a UEInformationRequest message sent by the network device, where the UEInformationRequest is used to request the terminal device to report the path information; and returning, by the terminal device, a UEInformationResponse (UEInformationResponse) message to the network device, where the response message includes the path information of the terminal device.

In another embodiment, that the terminal device sends path information to the network device may be: periodically and proactively reporting, by the terminal device, the path information to the network device.

In still another embodiment, that the terminal device sends path information to the network device may be: reporting, by the terminal device when entering a connected mode, the path information of the terminal device to the network device, for example, including the path information of the terminal device in an RRC setup request message or an RRC setup complete message.

In still another embodiment, that the terminal device sends path information to the network device may be: reporting, by the terminal device, the path information of the terminal device to the network device after receiving an RRC message that is sent by the network device and that includes measurement configuration information.

In still another embodiment, that the terminal device sends the path information to the network device may be: randomly reporting, by the terminal device, the path information to the network device. In an embodiment, the terminal device may transmit the path information between the terminal device and the network device by using the UEInformationResponse message, an RRC setup complete message, an RRC reconfiguration complete message, an RRC re-setup complete message, an RRC resume complete message, or other signaling used to send the path information.

In this embodiment of this application, how the terminal device reports the path information to the network device and in which case the terminal device reports the path information to the network device are not limited. For details, refer to a stipulation in a current protocol, or refer to a stipulation in a future protocol after development of communication technologies.

In the foregoing scenario in which the terminal device is an unmanned aerial vehicle, the path information of the terminal device in this embodiment of this application may also be referred to as route information of the terminal device. In this embodiment of this application, a specific name of the path information sent by the terminal device to the network device is not limited, and only a function limitation is imposed, where the function limitation is that the path information of the terminal device may indicate coordinates of a location at which the terminal device is already located, is to be located, or is being located.

For example, the unmanned aerial vehicle is used as an example to describe how the terminal device reports the path information. For reporting the path information by the unmanned aerial vehicle, refer to a stipulation in a current protocol. In an example, after receiving the UEInformationRequest message sent by the network device, the unmanned aerial vehicle returns a UEInformationResponse message to the network device. The response message may include location information of a plurality of coordinate points, and/or a horizontal flight speed of the unmanned aerial vehicle, and/or a vertical flight speed of the unmanned aerial vehicle.

Optionally, the path information may include location information of a coordinate point, for example, longitude information, latitude information, and height information. The path information may alternatively include timestamp information corresponding to the terminal device at the coordinate point. The timestamp information may include absolute time information and/or relative time information, for example, Beijing time, coordinated universal time (UTC), European time, or other time. This is not limited in this application.

S420: The network device sends, to the terminal device, CHO configuration information corresponding to a first cell.

After the network device learns of the path information, the network device can convert the path information into cell information based on the path information and an actual network deployment status, and determine at least one third cell based on the cell information. Learning of the path information by the network device may be reading the path information from a local storage (for example, in S410, after obtaining the path information, the network device stores the path information locally, and directly reads the path information from the local storage when the path information needs to be used), or may be requesting the terminal device to report the path information when the path information is required.

In an embodiment, the network device may convert three-dimensional location information corresponding to the coordinates in the path information into cell-related information (for example, a PCI, frequency information, a CGI, or an ECGI), and the network device can determine the at least one third cell based on the cell-related information obtained through conversion. The three-dimensional location information corresponding to the coordinates converted into cell-related information may be determining, based on the three-dimensional location information corresponding to the coordinates, related information about a cell that may exist near the coordinates.

Further, the source network device may use all or some of the at least one third cell as a fourth cell, and the fourth cell may include one or more cells. Further, after handover preparation of a CHO procedure is performed, for example, after performing handover preparation separately with a network device to which at least one fourth cell belongs, the source network device may obtain the first cell (or the CHO configuration information corresponding to the first cell) from the fourth cell. The first cell may include one or more cells, and the first cell may also be referred to as a candidate cell. Then, the source network device may send the CHO configuration information corresponding to the first cell to the terminal device.

It should be understood that there may be a plurality of first cells. To be specific, the source network device can determine a plurality of third cells based on received path information, an actual network deployment status, and the like. After using some or all cells of the third cells as fourth cells (for example, there may be a plurality of fourth cells), and performing handover preparation with the fourth cells, the source network device may determine one or more first cells, and send, to the terminal device, CHO configuration information corresponding to the at least one first cell.

For example, the source network device determines N third cells based on the path information reported by the terminal device and the actual network deployment status, and uses P cells of the N third cells as the fourth cells. After the handover preparation procedure is completed, the source network device may use M cells of the P cells as the first cells, where N, P, and M are positive integers, M is less than or equal to P, and P is less than or equal to N.

In an embodiment, the CHO configuration information corresponding to the first cells (for example, the M cells) may be included in the RRC message and sent to the terminal device. The RRC message may be a newly defined RRC message, or an RRC message specified in a current protocol may be reused. This is not limited in this embodiment of this application. For example, the RRC message in an NR system may be an RRC reconfiguration message, and the RRC message in an LTE system may be an RRC connection reconfiguration message.

In another embodiment, the CHO configuration information corresponding to the first cells may be included in other newly added or existing signaling and sent to the terminal device.

The CHO configuration information corresponding to the first cell includes CHO execution condition information. The CHO execution condition information may also be referred to as CHO trigger condition information. The CHO execution condition information may include a CHO trigger event type and a corresponding parameter (such as TTT, a threshold, and a hysteresis value). The CHO trigger event type may include an event B1, an event B2, an event A3, an event A4, an event A5, or another trigger event type. CHO execution conditions corresponding to different first cells may be the same or may be different. Refer to descriptions of the CHO execution conditions in the current protocol. This is not limited in this application.

The CHO configuration information corresponding to the first cell may alternatively include at least one of the following: a C-RNTI allocated by the first cell to the terminal device, resource information required by the terminal device to access the first cell, index information corresponding to the first cell, identification information of the first cell, frequency information of the first cell, a physical layer configuration parameter corresponding to the first cell, a MAC layer configuration parameter, an RLC layer configuration parameter, a PDCP layer configuration parameter, an SDAP layer configuration parameter, an RRC layer configuration parameter, or the like. The index information corresponding to the first cell may be a measurement identifier and/or a conditional handover configuration identifier (CHO-ConfigId). The identification information of the first cell may be a physical cell identifier (PCI), a cell global identifier (CGI), or an E-UTRAN cell global identifier (ECGI). The C-RNTI allocated by the first cell to the terminal device includes C-RNTIs allocated by the plurality of first cells to the terminal device. The identifier allocated by the first cell to the terminal device includes identifiers allocated by the plurality of first cells to the terminal device. The resource information required by the terminal device for accessing the first cell includes resource information required by the terminal device for accessing the plurality of first cells (or may be understood as resource information that is allocated by the plurality of first cells to the terminal device for accessing the terminal device).

Information content specifically included in the CHO configuration information corresponding to the first cell is not limited in this application. For details, refer to a stipulation in the current protocol. For example, when there are the plurality of first cells, the CHO configuration information corresponding to the first cells includes CHO configuration information respectively corresponding to the plurality of first cells, and the CHO configuration information respectively corresponding to the plurality of first cells may be sent to the terminal device by using one message, or may be sent to the terminal device by using a plurality of messages.

Optionally, different heights or height intervals correspond to different first cells. A height may be a height of the terminal device relative to the ground, or the height may be a height of the terminal device relative to a sea level, or the height may be a height of the terminal device relative to a reference point. This is not limited in this application. Specifically, in addition to the three-dimensional information in the path information, the network device may further determine, with reference to the path information, one or more first cells corresponding to different heights (or height intervals).

It should be understood that the first cell is a general term, and a plurality of cells may be referred to as the first cells. In this case, that different heights or height intervals correspond to different first cells may be understood as that cells corresponding to different heights or height intervals are different. Alternatively, it may be understood that cells corresponding to different heights or height intervals are not the same. For example, some first cells corresponding to different heights or height intervals are the same, and some first cells corresponding to different heights or height intervals are different. In this case, it is also referred to as that different heights or height intervals correspond to different first cells.

Further, the CHO configuration information corresponding to the first cell is height-related. For example, the CHO configuration information corresponding to the first cell is height-granularity or height-interval-granularity CHO configuration information. To be specific, for different heights (or height intervals), a network may provide different CHO configuration information (for example, provide CHO configuration information that is corresponding to the plurality of the first cells and that is respectively corresponding to a plurality of heights). In this case, all of the one or more first cells separately configured for different heights or height intervals may be different, or some are the same and some are different. In addition, for different heights or height intervals, even if some of the plurality of first cells are the same, CHO configuration information corresponding to these same cells may be the same or different. This is not limited in this application.

CHO configuration information corresponding to the plurality of different first cells may be included in the RRC message. The RRC message may alternatively include height thresholds (for example, H1 and H2) or height interval information (for example, [H3, H4], and [H5, H6]), and there is a correspondence between height thresholds (or height intervals) and the CHO configuration information corresponding to the plurality of different first cells.

For example, the RRC message sent by the network device to the terminal device includes H1, H2, and CHO configuration information config #1 (for example, config #1 includes config #1a corresponding to cell #2 and config #1b corresponding to cell #4) corresponding to the first cell, CHO configuration information config #2 (for example, config #2 includes config #2a corresponding to cell #1, config #2b corresponding to cell #2, config #2c corresponding to cell #3, config #2d corresponding to cell #4, and config #2e corresponding to cell #5) corresponding to the first cell, CHO configuration information config #3 (for example, config #3 includes config #3a corresponding to cell #1, config #3b corresponding to cell #3, and config #3c corresponding to cell #5) corresponding to the first cell. The CHO configuration information config #1 corresponding to the first cell corresponds to a height less than H1, the CHO configuration information config #2 corresponding to the first cell corresponds to a height greater than or equal to H1 and less than or equal to H2, and the CHO configuration information config #3 corresponding to the first cell corresponds to a height greater than H2. After receiving the RRC message sent by the network device, the terminal device may determine, based on the height of the terminal device, CHO configuration information that may be used in a process of determining whether a CHO execution condition is met. For example, when a flight height is lower than H1, the terminal device may use config #1; when the flight height is higher than or equal to H1 and lower than or equal to H2, the terminal device may use config #2; or when the flight height is higher than H2, the terminal device may use config #3. Further, after determining the CHO configuration information that can be used in the process of determining whether the CHO execution condition is met, the terminal device performs a subsequent procedure (for example, determining whether the CHO execution condition is met, determining a target cell, and attempting to access the target cell). For example, if the height of the terminal device is less than H1, the terminal device performs the subsequent procedure based on config #1; if the height of the terminal device is greater than or equal to H1 and less than or equal to H2, the terminal device performs the subsequent procedure based on config #2; or if the height of the terminal device is greater than H2, the terminal device performs the subsequent procedure based on config #3.

After determining the CHO configuration information (or a candidate cell corresponding to the CHO configuration information that can be used) that can be used in the process of determining whether the CHO execution condition is met, the terminal device can determine the target cell based on the determined CHO configuration information. The determined CHO configuration information is included in the CHO configuration information corresponding to the first cell. In other words, the method process shown in FIG. 4 further includes the following step: S430: The terminal device determines the target cell, where the determined target cell belongs to the candidate cell, and the target cell meets the CHO execution condition. In this embodiment of this application, the target cell is a cell to which the terminal device attempts to hand over/access, and a source cell is a cell that provides a service for the terminal device before the handover.

Optionally, the first cell includes one or more second cells that meet a corresponding CHO execution condition.

Alternatively, after receiving the RRC message including CHO configuration information corresponding to a height interval, the terminal device determines, with reference to the height of the terminal device, the CHO configuration information that can be used (or determines a fifth cell corresponding to the CHO configuration information that can be used), and then determines, based on the CHO configuration information that can be used, a cell (for example, a second cell) that meets the CHO execution condition and that is in the fifth cell.

That the terminal device determines the target cell includes: determining, by the terminal device, the target cell from the one or more second cells that meet the corresponding CHO execution condition.

In an embodiment, the terminal device may randomly determine the target cell from the one or more second cells.

In another embodiment, the terminal device determines the target cell from a plurality of second cells based on a distance change trend of the terminal device relative to the source cell. To be specific, when the plurality of second cells each meet the CHO execution condition, the terminal device may determine the target cell from the plurality of second cells based on a flight direction of the terminal device.

For example, when a distance of the terminal device relative to the source cell increases, the terminal device selects, from the plurality of second cells, a cell that is farthest from the source cell as the target cell; or when a distance of the terminal device relative to the source cell decreases, the terminal device selects, from the plurality of second cells, a cell that is nearest from the source cell as the target cell.

Optionally, the CHO configuration information corresponding to the first cell further includes distance information, where the distance information is used to indicate a distance between the first cell and the source cell.

The distance information used to represent the distance between the first cell (where the first cell may include one or more cells) and the source cell may be represented in a plurality of forms, for example, representing a distance length between the first cell and the source cell, or representing level information of the distance between the first cell and the source cell. A specific representation form of indication information is not limited in this application, provided that the terminal device can determine the distance between the first cell and the source cell based on the indication information.

Optionally, the level information may be represented by using a binary value. For example, if three first cells are configured, layer information may be represented by using a 2-bit binary value; or if five first cells are configured, the layer information may be represented by using a 3-bit binary value. A specific representation manner is as follows: A first cell closest to the source cell may be represented as level 0, and so on, that is, a smaller level indicates a shorter distance from the source cell; or on the contrary, a candidate cell farthest from the source cell may be represented as level 0, and so on, that is, a smaller level indicates a longer distance from the source cell. Optionally, a mapping relationship between level information and a distance (for example, a smaller binary value (or an equal level) indicates a shorter distance to the source cell or a longer distance to the source cell) may be agreed on by using a protocol or indicated by the network device. This is not limited in this embodiment of this application. It should be understood that representing the level information by using the binary value is merely an example, and does not constitute any limitation on the protection scope of this application. The level information may alternatively be represented in another form. For example, the level information may be represented by using an octal number, a decimal number, or a hexadecimal number. This is not limited in this embodiment of this application.

For example, the network device configures three first cells (for example, cell #1, cell #2, and cell #3). In the three first cells, if cell #2 is closest to the source cell, the layer information may be set to "00"; if cell #1 is second closest to the source cell, the layer information may be set to "01"; and if cell #3 is farthest from the source cell, the layer information may be set to "10". The RRC message that includes the CHO configuration information and that is sent by the network device to the terminal device may include CHO execution conditions corresponding to cell #1, cell #2, and cell #3 (where the CHO execution conditions corresponding to the three cells may be the same or different), a PCI corresponding to each of cell #1, cell #2, and cell #3, a C-RNTI allocated by each of cell #1, cell #2, and cell #3 to the terminal device, RACH resource information required for accessing cell #1, RACH resource information required for accessing cell #2, RACH resource information required for accessing cell #3, index information and frequency information of cell #1, index information and frequency information of cell #2, and index information and frequency information of cell #3. Optionally, the RRC message may further include layer information respectively corresponding to cell #1, cell #2, and cell #3. For example, the layer information of cell #1 is "01", the layer information of cell #2 is "00", and the layer information of cell #3 is "10". Alternatively, optionally, the RRC message may further include length values of distances from cell #1, cell #2, and cell #3 to the source cell. If the terminal device determines, based on the RRC message, that both cell #1 and cell #3 meet the CHO execution condition, the terminal device may determine the target cell with reference to a flight trend of the terminal device. For example, if the flight route of the terminal device is gradually moving away from the source cell, the terminal device may determine cell #3 as the target cell; or if the flight route of the terminal device is gradually approaching the source cell, the terminal device may determine cell #1 as the target cell.

That distance information of a distance between each first cell and the source cell is explicitly indicated by the network device is merely an example, and constitutes no limitation on the protection scope of this application. In another manner, the network device may implicitly indicate distance information of a distance between each first cell and the source cell. For example, it is specified in a protocol or indicated by using first indication information that first cells in the CHO configuration information corresponding to the plurality of first cells are arranged in descending order of distances from the source cell. To be specific, a $1^{st}$ cell included in the CHO configuration information corresponding to the first cells is farthest from the source cell, and a last cell is closest to the source cell. Alternatively, it is specified in the protocol or indicated by using second indication information that the first cells in the CHO configuration information corresponding to the plurality of first cells are arranged in ascending order of distances from the source cell, that is, a $1^{st}$ cell included in the CHO configuration information corresponding to the first cell is closest to the source cell, and a last cell is farthest from the source cell. Alternatively, there may be another implicit indication manner. Details are not described herein.

Optionally, the first indication information or the second indication information may be 1-bit information. For example, if a value is 0, it indicates that the first cells in the CHO configuration information corresponding to the first cells are sorted in descending order of distances from the source cell; or if a value is 1, it indicates that the first cells in the CHO configuration information corresponding to the first cells are sorted in descending order of distances from the source cell. It should be understood that, that the indication information is a 1-bit binary value is merely an example, and does not constitute any limitation on the protection scope of this application. The indication information may alternatively be represented in another form. For example, the first indication information or the second indication information may be a Boolean value and indicates whether an information element is carried. This is not limited in this embodiment of this application.

The distance between the terminal device and the source cell may be understood as a straight-line distance between the terminal device and the source cell, a vertical distance between the terminal device and the source cell, a horizontal distance between the terminal device and the source cell, or the like. The distance between the first cell and the source cell may be understood as a straight-line distance between the first cell and the source cell, a vertical distance between the first cell and the source cell, a horizontal distance between the first cell and the source cell, or the like.

In still another embodiment, the terminal device determines the target cell from the plurality of second cells based on signal quality change trends of the plurality of second cells. The signal quality change trend of the second cell includes a change trend of signal quality of the second cell in TTT corresponding to the second cell, for example, a change trend of cell signal quality of the second cell in the TTT corresponding to the second cell, and/or a change trend of signal quality of a beam of the second cell in the TTT corresponding to the second cell. For example, the target cell is a cell, in the plurality of second cells, whose signal quality change trend is an upward trend.

Optionally, the CHO configuration information corresponding to the first cell further includes a signal quality threshold. The signal quality threshold may include a signal quality threshold (for example, a threshold E) of the cell and/or a signal quality threshold (for example, a threshold F)

of the beam. If signal quality of a cell presents an upward trend within corresponding TTT, a signal quality change rate is greater than or equal to the signal quality threshold, and the cell meets the CHO execution condition within the corresponding TTT, the cell may be determined as the target cell. For example, if cell signal quality of a cell presents an upward trend within corresponding TTT, a change rate of the signal quality of the cell is greater than or equal to the signal quality threshold (for example, E) of the cell, and the cell meets the CHO execution condition within the corresponding TTT, the cell may be determined as the target cell. Alternatively, if signal quality of at least one beam (for example, M beams, M is a positive integer greater than or equal to 1, and M may be agreed on in a protocol or may be carried in the RRC message including the CHO configuration information) of a cell presents an upward trend in corresponding TTT, a change rate of signal quality of the cell is greater than or equal to the signal quality threshold (for example, F) of the beam, and the cell meets the CHO execution condition in the TTT corresponding to the cell, the cell may be determined as the target cell. Alternatively, if cell signal quality of a cell presents an ascending trend in corresponding TTT and a change rate of the signal quality of the cell is greater than or equal to the signal quality threshold (for example, E) of the cell, and in addition, signal quality of at least one beam (for example, M beams, M is a positive integer greater than or equal to 1, and M may be agreed on in a protocol or carried in the RRC message including the CHO configuration information) of the cell presents an ascending trend in corresponding TTT, a change rate of the signal quality of the at least one beam is greater than or equal to a signal quality threshold (for example, F) of the beam, and the cell meets the CHO execution condition in the TTT corresponding to the cell, the cell may be determined as the target cell.

In still another embodiment, the terminal device determines the target cell from the plurality of second cells based on signal quality change trends of the plurality of second cells that meet the CHO execution condition and a distance change trend of the terminal device relative to the source cell.

For example, when the distance of the terminal device relative to the source cell increases, the terminal device selects, from the plurality of second cells, a cell whose signal quality change trend is an upward trend and that is in at least one second cell far from the source cell as the target cell; or when the distance of the terminal device relative to the source cell decreases, the terminal device selects, from the plurality of second cells, a cell whose signal quality change trend is an upward trend and that is in at least one second cell near the source cell as the target cell.

It should be understood that the foregoing manner of determining the target cell from the plurality of second cells may be combined with S410 and S420 (that is, the first cell is first determined based on the path information in S410 and S420, and then the target cell is determined from the first cell in S430).

In still another embodiment, in S420, the network device sends, to the terminal device, the CHO configuration information corresponding to the first cell. In this scenario, the network device may determine the first cell not based on the path information reported by the terminal device, and S410 may not be performed in this embodiment. For example, the network device may determine, based on a measurement report, that the terminal device in the first cell receives the CHO configuration information corresponding to the first cell, and then determine the target cell from the first cell based on S430. Details are not described again in this application.

Sequence numbers of the foregoing processes do not mean execution sequences in the foregoing method embodiment. The execution sequences of the processes should be determined based on functions and internal logic of the processes, and should not be construed as any limitation on the implementation processes of embodiments of this application. In addition, it is possible that not all operations in the foregoing method embodiment need to be performed.

It should be understood that the terminal device and/or the network device in the foregoing method embodiment may perform some or all of the steps in the embodiments. These steps or operations are merely examples. Embodiments of this application may further include performing other operations or variants of various operations.

It should be further understood that, in embodiments of this application, unless otherwise specified or in case of a logical conflict, terms and/or descriptions in different embodiments may be consistent and may be mutually referenced. Technical features in different embodiments may be combined based on an internal logical relationship of the technical features to form a new embodiment.

The foregoing describes in detail the handover method provided in embodiments of this application with reference to FIG. 4. The following describes in detail handover apparatuses provided in embodiments of this application with reference to FIG. 5 to FIG. 8.

Figure 5:
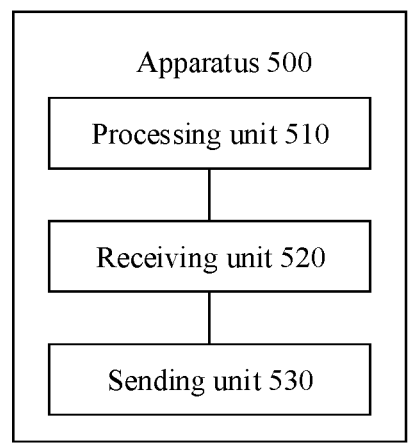
FIG. 5 is a schematic diagram of a handover apparatus 500 according to this application.

FIG. 5 is a schematic diagram of a handover apparatus 500 according to this application. As shown in FIG. 5, the apparatus 500 includes a processing unit 510, a receiving unit 520, and a sending unit 530.

The sending unit 530 is configured to send path information of a terminal device to a network device, where the path information is used to determine a first cell;

the receiving unit 520 is configured to receive, from the network device, conditional handover CHO configuration information corresponding to the first cell; and the processing unit 510 is configured to determine a target cell based on the CHO configuration information corresponding to the first cell.

The apparatus 500 corresponds to the terminal device in the method embodiment. The apparatus 500 may be the terminal device in the method embodiment, or may be a chip or a functional module inside the terminal device in the method embodiment. Corresponding units of the apparatus 500 are configured to perform corresponding steps performed by the terminal device in the method embodiment shown in FIG. 4.

The processing unit 510 in the apparatus 500 is configured to perform a corresponding processing-related step of the terminal device in the method embodiment. For example, step S430 of determining the target cell in FIG. 4 is performed.

The receiving unit 520 in the apparatus 500 performs a receiving step of the terminal device in the method embodiment. For example, step S420 of receiving the conditional handover CHO configuration information corresponding to the first cell that is sent by the network device in FIG. 4 is performed.

The sending unit 530 in the apparatus 500 is configured to perform a sending step of the terminal device, for example, perform step S410 of sending the path information to the network device in FIG. 4. The receiving unit 520 and the sending unit 530 may form a transceiver unit that has both receiving and sending functions. The processing unit 510 may be at least one processor. The sending unit 530 may be a transmitter or an interface circuit, and the receiving unit 520 may be a receiver or an interface circuit. The receiver and the transmitter may be integrated to form a transceiver or an interface circuit.

Optionally, the apparatus 500 may further include a storage unit, configured to store data and/or signaling. The processing unit 510, the sending unit, and the receiving unit 520 may interact with or be coupled to the storage unit, for example, read or invoke the data and/or signaling in the storage unit, so that the method in the foregoing embodiment is performed.

The foregoing units may exist independently, or may be all or partially integrated.

Figure 6:
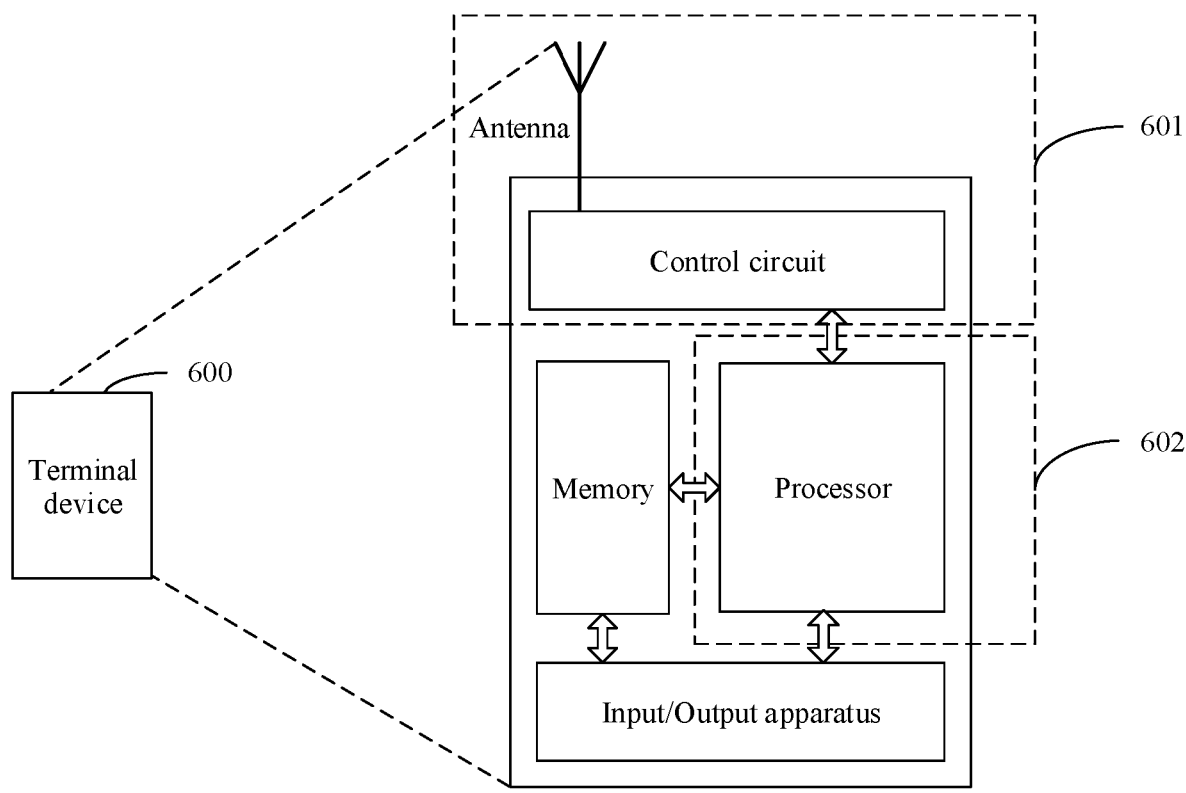
FIG. 6 is a schematic diagram of a structure of a terminal device 600 applicable to an embodiment of this application.

FIG. 6 is a schematic diagram of a structure of a terminal device 600 applicable to an embodiment of this application. The terminal device 600 may be applied to the system shown in FIG. 1. For ease of description, FIG. 6 shows only main components of the terminal device. As shown in FIG. 6, the terminal device 600 includes a processor, a memory, a control circuit, an antenna, and an input/output apparatus. The processor is configured to control the antenna and the input/output apparatus to send and receive a signal. The memory is configured to store a computer program. The processor is configured to invoke the computer program from the memory and run the computer program, to perform a corresponding procedure and/or operation performed by the terminal device in the handover method provided in this application. Details are not described herein again.

A person skilled in the art may understand that, for ease of description, FIG. 6 shows only one memory and one processor. An actual terminal device may include a plurality of processors and memories. The memory may also be referred to as a storage medium, a storage device, or the like. This is not limited in embodiments of this application.

Figure 7:
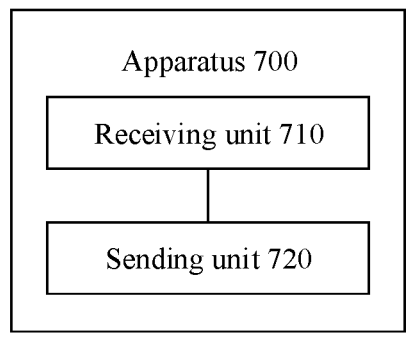
FIG. 7 is a schematic diagram of a handover apparatus 700 according to this application.

FIG. 7 is a schematic diagram of a handover apparatus 700 according to this application. As shown in FIG. 7, the apparatus 700 includes a receiving unit 710 and a sending unit 720.

The receiving unit 710 is configured to receive path information of a terminal device from the terminal device, where the path information is used to determine a first cell; and the sending unit 720 is configured to send, to the terminal device, conditional handover CHO configuration information corresponding to the first cell.

The apparatus 700 corresponds to a network device in the method embodiment. The apparatus 700 may be the network device in the method embodiment, or may be a chip or a functional module inside the network device in the method embodiment. Corresponding units of the apparatus 700 are configured to perform corresponding steps performed by the network device in the method embodiment shown in FIG. 4.

The sending unit 720 in the apparatus 700 performs a sending step of the network device in the method embodiment, for example, performs step S420 of sending, to the terminal device, the conditional handover CHO configuration information corresponding to the first cell in FIG. 4.

The receiving unit 710 in the apparatus 700 is configured to perform a receiving step of the network device, for example, step S410 of receiving the path information sent by the terminal device. The apparatus 700 may further include a processing unit, configured to perform a corresponding processing-related step in the network device. The receiving unit 710 and the sending unit 720 may form a transceiver unit that has both receiving and sending functions. The processing unit may be at least one processor. The sending unit 720 may be a transmitter or an interface circuit. The receiving unit 710 may be a receiver or an interface circuit. The receiver and the transmitter may be integrated to form a transceiver or an interface circuit.

Optionally, the apparatus 700 may further include a storage unit, configured to store data and/or signaling. The processing unit, the sending unit 720, and the receiving unit 710 may interact with or be coupled to the storage unit, for example, read or invoke the data and/or signaling in the storage unit, so that the method in the foregoing embodiment is performed.

The foregoing units may exist independently, or may be all or partially integrated.

Figure 8:
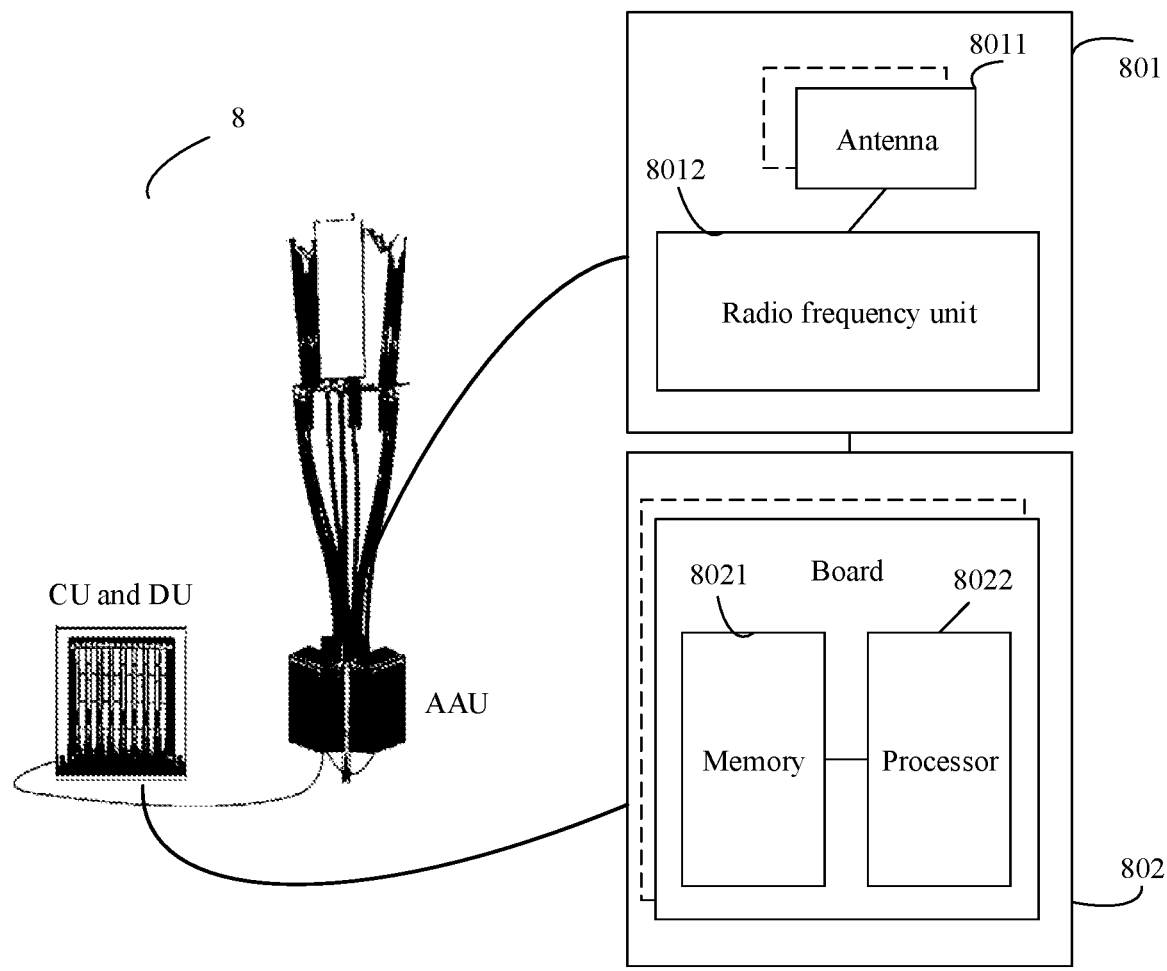
FIG. 8 is a schematic diagram of a structure of a network device 800 applicable to an embodiment of this application.

FIG. 8 is a schematic diagram of a structure of a network device 800 applicable to an embodiment of this application. The network device 800 may be configured to implement a function of the network device in the foregoing handover method. FIG. 8 may be a schematic diagram of a structure of a network device.

In a possible manner, for example, in some implementation solutions in a 5G communication system, the network device 800 may include a CU, a DU, and an AAU. In comparison with a case in which a network device in an LTE communication system includes one or more radio frequency units, for example, remote radio units (RRUs), and one or more baseband units (BBUs):

A non-real-time part of an original BBU is split and redefined as the CU, which is responsible for processing a non-real-time protocol and service. Some physical layer processing functions of the BBU are combined with the original RRU and a passive antenna into an AAU, and remaining functions of the BBU are redefined as the DU, which is responsible for processing a physical layer protocol and a real-time service. In short, the CU and the DU are distinguished between each other based on real-time performance of processed content, and the AAU is a combination of the RRU and an antenna.

The CU, DU, and AAU may be separated or co-located. Therefore, there are a plurality of network deployment forms. One possible deployment form is consistent with that of a traditional 4G network device, that is, the CU and DU are deployed on a same hardware. It should be understood that, FIG. 8 is merely an example, and constitutes no limitation on the protection scope of this application. For example, a deployment form may alternatively be that DUs are deployed in a 5G BBU equipment room, CUs or DUs are deployed together, or CUs are centralized at a higher level.

The AAU 801 may implement a transceiver function, which is referred to as a transceiver unit 801 and corresponds to the sending unit 720 in FIG. 7. Optionally, the transceiver unit 801 may also be referred to as a transceiver machine, a transceiver circuit, a transceiver, or the like, and may include at least one antenna 8011 and a radio frequency unit 8012. Optionally, the transceiver unit 801 may include a receiving unit and a sending unit. The receiving unit may correspond to a receiver (or referred to as a receiver machine or a receiver circuit), and the sending unit may correspond to a transmitter (or referred to as a transmitter machine or a transmitter circuit). The "CU and DU" 802 may implement an internal processing function, and are referred to as a processing unit 802. Optionally, the processing unit 802 may control the network device or the like, and may be referred to as a controller. The AAU 801, and the "CU and DU" 802 may be physically disposed together, or may be physically disposed separately.

In addition, the network device is not limited to the form shown in FIG. 8, and may also be in another form. For example, the network device includes the BBU and the ARU, or includes the BBU and the AAU, or may be a CPE, or may be in another form. This is not limited in this application.

It should be understood that the network device 800 shown in FIG. 8 can implement a function of the network device in the method embodiment in FIG. 4. Operations and/or functions of the units in the network device 800 are used to implement a corresponding procedure performed by the network device in the foregoing method embodiment. To avoid repetition, detailed descriptions are appropriately omitted herein. The structure of the network device shown in FIG. 8 is merely a possible form, and should not constitute any limitation on embodiments of this application. In this application, a possibility that there may be a network device structure in another form in the future is not excluded.

An embodiment of this application further provides a communication system, including the foregoing terminal device and network device.

This application further provides a computer-readable storage medium, where the computer-readable storage medium stores instructions, and when the instructions are run on a computer, the computer is enabled to perform the steps performed by the terminal device in the method shown in FIG. 4.

This application further provides a computer-readable storage medium, where the computer-readable storage medium stores instructions, and when the instructions are run on a computer, the computer is enabled to perform the steps performed by the network device in the method shown in FIG. 4.

This application further provides a computer program product including instructions. When the computer program product is run on a computer, the computer is enabled to perform the steps performed by the terminal device in the method shown in FIG. 4.

This application further provides a computer program product including instructions. When the computer program product is run on a computer, the computer is enabled to perform the steps performed by the network device in the method shown in FIG. 4.

This application further provides a chip, including a processor. The processor is configured to read and run a computer program stored in a memory, to perform a corresponding operation and/or procedure performed by a terminal device in a handover method provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information to be processed, and the processor obtains the data and/or information from the communication interface, and processes the data and/or information. The communication interface may be an input/output interface, an interface circuit, an output circuit, an input circuit, a pin, a related circuit, or the like on the chip. The processor may alternatively be embodied as a processing circuit or a logic circuit.

This application further provides a chip, including a processor. The processor is configured to read and run a computer program stored in a memory, to perform a corresponding operation and/or procedure performed by a network device in a handover method provided in this application. Optionally, the chip further includes the memory, the memory is connected to the processor through a circuit or a wire, and the processor is configured to read and execute the computer program in the memory. Further, optionally, the chip further includes a communication interface, and the processor is connected to the communication interface. The communication interface is configured to receive data and/or information to be processed, and the processor obtains the data and/or information from the communication interface, and processes the data and/or information. The communication interface may be an input/output interface, an interface circuit, an output circuit, an input circuit, a pin, a related circuit, or the like on the chip. The processor may alternatively be embodied as a processing circuit or a logic circuit.

The foregoing chip may be replaced with a chip system, and details are not described herein.

In this application, the terms "include", "have" and any other variants mean to cover the non-exclusive inclusion, for example, a process, method, system, product, or device that includes a series of steps or units is not necessarily limited to those steps or units that are clearly listed, but may include other steps or units not expressly listed or inherent to such a process, method, product, or device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and unit, refer to a corresponding process in the method embodiment. Details are not described herein again.

In a plurality of embodiments provided in this application, it should be understood that the disclosed system, the apparatus, and the method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, to be specific, may be located in one position, or may be distributed on a plurality of network units. A part or all of the units may be selected based on an actual requirement to achieve the objectives of the solutions of the embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in the computer-readable storage medium. Based on such an understanding, the technical solutions of this application essentially, or the part contributing to the conventional technology, or some of the technical solutions may be implemented in a form of a software product. The computer software product is stored in a storage medium, and includes a plurality of instructions for instructing a computer device (which may be a personal computer, a server, or the network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A handover method, comprising:
sending, by a terminal device, path information of the terminal device to a network device, wherein the path information is used to determine a first cell and includes coordinates of a location at which the terminal device is already located, is to be located, or is being located, wherein the first cell is a candidate cell;
receiving, by the terminal device, conditional handover (CHO) configuration information corresponding to the first cell from the network device; and
determining, by the terminal device, a target cell based on the CHO configuration information corresponding to the first cell;
wherein the CHO configuration information corresponding to the first cell comprises a CHO execution condition and at least one of the following information:
a cell radio network temporary identifier (C-RNTI) allocated by the first cell to the terminal device, resource information required by the terminal device for accessing the first cell, index information corresponding to the first cell, identification information of the first cell, or frequency information of the first cell;
wherein the first cell comprises one or more second cells that satisfy a corresponding CHO execution condition, and the determining, by the terminal device, the target cell based on the CHO configuration information corresponding to the first cell comprises:
determining, by the terminal device, the target cell from the one or more second cells based on a distance change trend of the terminal device relative to a source cell, by:
based on a distance of the terminal device relative to the source cell increasing, selecting, by the terminal device from the one or more second cells, a second cell that is farthest from the source cell as the target cell;
or
based on a distance of the terminal device relative to the source cell decreasing, selecting, by the terminal device from the one or more second cells, a second cell that is nearest from the source cell as the target cell.

2. The method according to claim 1, wherein the CHO configuration information corresponding to the first cell is height-related.

3. The method according to claim 1, wherein the CHO configuration information corresponding to the first cell further comprises distance information, wherein the distance information is used to indicate a distance between the first cell and the source cell.

4. The method according to claim 1, wherein the determining, by the terminal device, the target cell from the one or more second cells comprise: determining, by the terminal device, the target cell from the one or more second cells based on signal quality change trends of the one or more second cells, wherein a signal quality change trend of a second cell comprises a change trend of signal quality of the second cell in a time to trigger (TTT) corresponding to the second cell.

5. A handover method, comprising:
receiving, by a network device, path information of a terminal device from the terminal device, wherein the path information is used to determine a first cell and includes coordinates of a location at which the terminal device is already located, is to be located, or is being located, wherein the first cell is a candidate cell; and
sending, by the network device to the terminal device, conditional handover (CHO) configuration information corresponding to the first cell;
wherein the CHO configuration information corresponding to the first cell comprises a CHO execution condition and at least one of the following information:
a cell radio network temporary identifier (C-RNTI) allocated by the first cell to the terminal device, resource information required by the terminal device for accessing the first cell, index information corresponding to the first cell, identification information of the first cell, or frequency information of the first cell;
wherein the first cell comprises one or more second cells that satisfy a corresponding CHO execution condition, and wherein the CHO configuration information corresponding to the first cell enables the terminal device to determine the target cell from the one or more second cells based on a distance change trend of the terminal device relative to a source cell, by:
based on a distance of the terminal device relative to the source cell increasing, selecting, by the terminal device from the one or more second cells, a second cell that is farthest from the source cell as the target cell;
or
based on a distance of the terminal device relative to the source cell decreasing, selecting, by the terminal device from the one or more second cells, a second cell that is nearest from the source cell as the target cell.

6. The method according to claim 5, wherein the CHO configuration information corresponding to the first cell is height-related.

7. The method according to claim 5, wherein the CHO configuration information corresponding to the first cell further comprises distance information, wherein the distance information is used to indicate a distance between the first cell and the source cell.

8. A handover apparatus, comprising:
a transceiver, configured to:
send path information of a terminal device to a network device, wherein the path information is used to determine a first cell and includes coordinates of a location at which the terminal device is already located, is to be located, or is being located, wherein the first cell is a candidate cell; and
receive, from the network device, conditional handover (CHO) configuration information corresponding to the first cell; and
a processor, configured to determine a target cell based on the CHO configuration information corresponding to the first cell;
wherein the CHO configuration information corresponding to the first cell comprises a CHO execution condition and at least one of the following information:
a cell radio network temporary identifier (C-RNTI) allocated by the first cell to the terminal device, resource information required by the terminal device for accessing the first cell, index information corresponding to the first cell, identification information of the first cell, or frequency information of the first cell;

wherein the first cell comprises one or more second cells that satisfy a corresponding CHO execution condition, and that the processor determines the target cell based on the CHO configuration information corresponding to the first cell comprises:
determining, by the processor, the target cell based on CHO configuration information corresponding to the first cell comprises:
determining, by the processor, the target cell from the one or more second cells based on a distance change trend of the terminal device relative to a source cell, by:
based on a distance of the terminal device relative to the source cell increasing, selecting, by the processor from the one or more second cells, a second cell that is farthest from the source cell as the target cell;
or
based on a distance of the terminal device relative to the source cell decreasing, selecting, by the processor from the one or more second cells, a second cell that is nearest from the source cell as the target cell.

9. The apparatus according to claim 8, wherein the CHO configuration information corresponding to the first cell is height-related.

* * * * *